United States Patent [19]

Arnett

[11] Patent Number: 5,659,650

[45] Date of Patent: Aug. 19, 1997

[54] HINGED FACEPLATE

[75] Inventor: Jaime Ray Arnett, Fishers, Ind.

[73] Assignee: Lucent Technologies Inc., Murray Hill, N.J.

[21] Appl. No.: 534,217

[22] Filed: Sep. 26, 1995

[51] Int. Cl.$^6$ .................................................. G02B 6/36
[52] U.S. Cl. ................................................................ 385/135
[58] Field of Search ...................................... 385/134, 135, 385/76

[56] References Cited

U.S. PATENT DOCUMENTS

| | | | |
|---|---|---|---|
| 4,261,633 | 4/1981 | Abernethy | 339/97 P |
| 4,859,201 | 8/1989 | Marsh | 439/290 |
| 4,898,448 | 2/1990 | Cooper | 385/135 |
| 5,041,081 | 8/1991 | Arnett | 439/536 |
| 5,052,775 | 10/1991 | Bossard et al. | 385/135 |
| 5,093,885 | 3/1992 | Anton | 385/135 |
| 5,096,439 | 3/1992 | Arnett | 439/536 |
| 5,212,752 | 5/1993 | Stephenson et al. | 385/78 |
| 5,238,426 | 8/1993 | Arnett | 439/557 |
| 5,274,729 | 12/1993 | King et al. | 385/134 |
| 5,302,140 | 4/1994 | Arnett | 439/557 |
| 5,446,822 | 8/1995 | Keith | 385/135 |

*Primary Examiner*—John Ngo

[57] ABSTRACT

A faceplate for mounting to an outlet box located behind a wall has an upper portion and a lower portion. The upper portion is pivotally attached to the lower portion so that it may be swung out from the wall to permit access to the rear thereof and to the outlet box. The front face of the faceplate has one or more openings therein into which both electrical and optical fiber type couplers may be fitted. The front face of the faceplate has tracks formed thereon for mounting a protective hood, and the rear face of the faceplate has an aperture therein for receiving and mounting a fiber or wire storage member.

17 Claims, 6 Drawing Sheets

HINGED FACEPLATE

FIELD OF INVENTION

This invention relates to outlets for communication type cables and more particularly to an outlet for connecting multiple types of electrical and optical fiber cables to a standard wall mounted electrical box.

BACKGROUND OF THE INVENTION

In present day communications involving signal transmitting communication lines, several standardized interface connecting arrangements have been adopted for establishing electrical connections to the lines. One such interface is the miniature or modular jack, which has been adopted by the U.S. Federal Communications Commission as the standard connector for connecting telephone equipment to communications, i.e., telephone, lines. This jack, however, comes in different versions, depending upon the number of electrical contacts to be made, e.g., four, six, or eight. In addition, other connectors, such as coaxial connectors, exist for equipment other than telephones that share the same location at a customer's premises, but do not share the same interface standard. Because a large number of such non-standard connector types exists, individual and separate housings and wall plates are necessary to enable the customer to connect all of his or her communications equipment to the proper incoming and outgoing communications lines.

In U.S. Pat. No. 4,261,633, there is shown a jack frame molded into a wall plate as an integral part thereof. However, this arrangement has the disadvantage, as suggested hereinbefore, of requiting a different wall plate for each different jack, different plates being needed for jacks that differ from each other only slightly. U.S. Pat. No. 4,859,201 represents an improvement over the '633 patent in that it can accommodate a number of jack outlets where, conceivably, the jacks could be different from each other. However, the embodiments disclosed in that patent do not provide for easy and quick attachment and removal of the jacks to and from the wall plate. U.S. Pat. No. 5,096,439 of Arnett is directed to an arrangement for mounting a number of jacks to a single wall plate with a simple and convenient arrangement for attaching and releasing the jacks to and from the wall plate. Thus, it can be appreciated that the prior art, in the electrical communications area, has progressed to the point of accommodating multiple jacks in a single wall plate. However, there does not appear to be, in the prior art, any arrangement for accommodating both electrical wires and optical fibers in a single flush mounted wall plate. There are, in the prior art, arrangements using both electrical and optical connections. However, these arrangements are not flush mounted, generally requiring special boxes for containing the connections, which do not provide ready and easy access to the connectors. In part, this is a consequence of the very special handling and connecting limitations for optical fiber.

Optical fiber cables, more particularly single buffered fibers encased in a protective member, require extreme care in handling and in connecting, as well as positioning and storing. The fiber cannot be wound or bent to a radius less than a prescribed minimum without the occurrence of micro-cracks. Thus, it is important that some form of strain relief be used in routing the fiber. Further, it is desirable that the fiber be guided and supported to eliminate any loose fiber sags or loops that could, possibly, be inadvertently snagged or twisted, thereby risking damage to the fiber. In addition, the connection of the fiber to another fiber or to apparatus requires that the connector be capable of joining two optical fiber ends with a minimum of insertion loss and it must be mechanically stable while providing adequate protection to the junction between the fibers. There are, in the present state of the art, numerous types of optical fiber connectors in use, which are, for the most part, incompatible with each other and which vary as to size, shape and mode of connection. This problem is treated in U.S. Pat. Nos. 5,274,729 of King et al. and 5,238,426 of Arnett in the context of universal patch panels. In the King et al. patent, the patch panel has a plurality of differently sized and shaped openings for accommodating the mounting hardware, by means of build-outs, of a plurality of different optical connectors. The Arnett arrangement has a patch panel or plate having a plurality of substantially identical openings therein in which are mounted adapters for different types of optical couplers as well as electrical couplers. Neither patent deals with wall plates and the additional problems attendant thereto.

The standard wall plate functions as a cover for the commonly used NEMA (National Electrical Manufacturers Association) electrical outlet box, generally mounted to the rear of the wall. As such, the wall plate generally has one or more electrical jacks, with connecting wires being stored in the outlet box or passing therethrough, where necessary. Such an assembly is compact, efficient, and simple to use, the customer, for example, having only to plug a connector jack into its receptacle on the faceplate to complete the connection. However, the prior art, for the most part, does not address making the faceplate universal, i.e., accommodative of both electrical and optical fiber connectors, to the same degree that the universal patch panel has been fabricated. This stems, in part, from the care with which the optical fiber must be treated.

The care exercised in handling fibers is embodied, for example, in the SC connector, the general industry acceptance of which is increasing rapidly. Such a connector for connecting buffered fibers is shown and described in U.S. Pat. No. 5,212,752 of Stephenson, et al. An SC connector includes a ferrule assembly including a barrel having a collar at one end and an optical fiber terminating ferrule projecting from the barrel. The ferrule assembly is disposed in a plug frame such that an end portion of the ferrule projects from one end of the frame. The plug frame is configured to snap lock into a grip member, and the grip is inserted into one side of the coupler and locked thereto, while the corresponding grip of another SC connector is inserted into the other side of the coupler and locked. The coupler is dimensional such that when the two connectors are inserted therein, the ends of the ferrules abut each other to form a low insertion loss optical connection. When the SC coupler is to be mounted to a wall plate, for example, the plate incorporates a housing member into which the couplers are inserted, thus the body of the coupler extends outwardly from the surface of the wall plate.

In any such mounting of an optical fiber, there are certain restraints that must be observed which are aimed at protecting the fiber. Thus, there is a need for slack in the usually buffered optical fiber to allow for handling and routing without incurring too sharp bends in the fiber. The Electronics Industry Association Spec. 568A calls for at least one meter of fiber slack which may be stored on a storage spool, and a minimum bending radius of three quarters of an inch (¾"). Thus, any wall mounting for optical fiber must be capable of meeting these constraints, which is difficult to realize where space is at a premium. These constraints on the optical fiber mode of connection have, apparently for the most part, deterred efforts to realize a universal faceplate flush mounting arrangement for both electrical and fiber connectors, especially where it is necessary or desirable to use the NEMA standard outlet box as a part of the outlet assembly.

Because of the rapidly growing use of both optical fibers and electrical wires and cables in the same milieu, attention has been directed more and more to the realization of some form of universal connector or outlet. There is in the prior art, for example, an arrangement for connecting both electrical wires and optical fibers to an outlet box which comprises a box or container consisting of a base plate and a cover plate, with the base plate adapted to be mounted on the front of the outlet box. The base plate provides for snap-in SC and ST connector modules (couplers) oriented vertically and opening toward the bottom sidewall of the faceplate. Within the volume defined by the base plate are pins and flanges for coiling the optical fibers within the volume with an acceptable bend radius. The faceplate has provision for housing electrical jacks wherein the wires therefrom are passed directly through the container to the outlet box. When assembled and mounted in place, the optical fiber connector modules are not readily visible and connection thereto is apparently achieved by feel. The cover is removable only by unscrewing and thus, ready access to the modules is not easily realized. The fiber is coiled somewhat loosely within the container and not well secured therein, and is stored on the room side of the wall, without the protection of the wall against damage. Thus, the prior art arrangement leaves much to be desired in overcoming the various problems encountered with universal connecting assemblies pointed out heretofore.

SUMMARY OF THE INVENTION

The present invention is a flush mounted universal outlet having a hinged faceplate primarily for use in customer premises, wherein both electrical and optical connections are easily made, and which meets the protective restraints specified for optical fibers.

In the following discussion and claims, the term "cable" is used generically to include insulated wires and individual optical fibers, preferably buffered.

The invention, in an illustrative embodiment thereof, comprises a flush mounted wall plate adapted to fit to or mate with, a standard outlet box. The wall plate has one or more telephone type modular jacks, although other types of connectors, such as coaxial connectors, may be used in place of or in conjunction with, modular telephone jacks. In addition, the plate has mounted thereon an optical duplex fiber coupler body for receiving, at the front of the wall plate, first and second optical fiber connectors, preferably, but not necessarily of the SC type. The body is mounted on the plate, or integral therewith, such that the receptacles therein for receiving the connectors are oriented at an angle to the plane of the wall or faceplate. Such angular orientation eliminates, to a large extent, any possible physical interference between the modular telephone jacks and wires and the optical fiber connectors and connected fibers, thereby providing sufficient room for the jacks and the connectors to be independently inserted and removed. In addition, as will be apparent hereinafter, such angular orientation results in the connectors, when in place, projecting downward at an angle instead of projecting straight out from the wall or faceplate, which latter is an orientation in which they can be easily damaged by an accidental impingement from, for example, people or moving furniture or apparatus. The orientation of the couplers and connectors makes them clearly visible to one inserting or removing connectors, thus greatly facilitating such insertion and removal from the room side of the wall. The angular orientation also makes the assembly more compact so that a slidable protective cover or hood, designed to mount to the wall or faceplate, covers both the optical fiber connectors and the electrical connectors. The slidable cover protects the connectors and couplers in use, and can be slid up or removed to provide access to the couplers.

In a preferred embodiment, the faceplate comprises a first, lower portion which is adapted to be mounted to the front of the outlet box, and a second, upper portion which is pivotally mounted to the first portion. The second portion is, like the first portion, adapted to be mounted to the front of the outlet box. Thus, the faceplate, in use, is securely mounted to the outlet box. However, when it is desirable to access the rear of the faceplate, or the interior of the outlet box, for any reason, the upper portion of the faceplate may be disconnected from the outlet box and pivoted forward and down, thereby providing the desired access to the outlet box and the rear of the faceplate.

The front of the faceplate is provided with substantially L-shaped aligned members which define tracks for receiving first and second opposed flanges on the hood or cover so that it may quickly be slid into place over the faceplate to protect the various connectors. Thus, the cover can be easily removed or slid up from its position covering the fiber connectors for access to the connectors, which, being at an angle, are both visible and accessible to one removing or inserting a connector.

At the rear of the faceplate is mounted a means for guiding and storing the optical fibers that lead from rear SC connectors, which are inserted in the rear of the duplex coupler. The guiding and storing means comprises a storage spool having guide and retaining members thereon for receiving, holding, and storing the fibers from the rear mounted connectors. Projecting from the surface of the spool in the preferred embodiment is a mounting member in the form of a plate having, at the distal end thereof, the male portion or member similar to a telephone connector plug, which is snap fitted into a receptacle in the wall plate by means of one or more resilient tabs. Thus, when the male member is snapped into place on the face or wall plate, the storage spool is securely mounted thereto. The mounting plate also has, intermediate its ends, a curved fiber guide flange for guiding the fibers from the rear mounted connectors to the storage spool, thereby eliminating to a large extent the possibility of fiber kinking, as well as minimizing any unsupported lengths of fibers or slack. The storage spool can also function as a storage member for electrical wiring from the rear mounted connectors, especially when the wall plate is used with electrical connection and couplers only.

As will be apparent hereinafter, the storage spool and support plate are dimensioned so that they readily fit within the outlet box when the wall plate is affixed thereto. Also, when the hinged wall plate is swung forward for access to the rear thereof, the spool and mounting plate swing clear of the outlet box without any interference or likelihood of fiber damage.

The numerous features and advantages of the present invention will be more readily apparent from the following detailed description, read in conjunction with the accompanying drawings.

DETAILED DESCRIPTION

Figure 1:
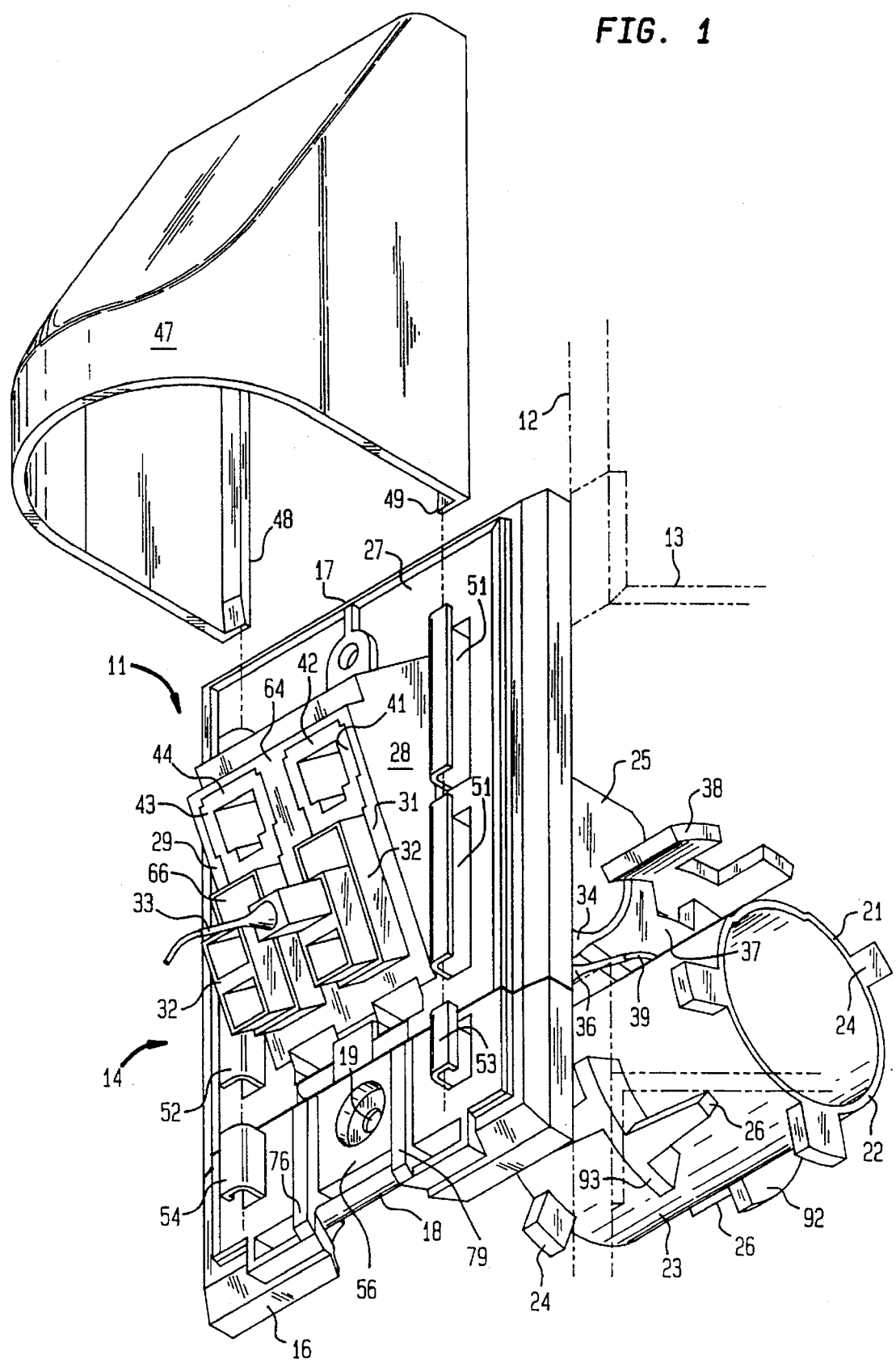
FIG. 1 is a perspective view of the flush mounted wall plate assembly of the present invention.

In FIG. 1 there is shown the flush mounted wall plate assembly 11 embodying the principles and features of the present invention. The wall plate assembly 11 is adapted to be mounted on a wall 12 shown in dashed-dot lines in an opening having mounted therein, on the rear side of wall 12, a standard NEMA electrical outlet box 13, shown in dashed lines.

As discussed hereinbefore, any connector or outlet mounting should provide as much protection as possible to the fiber, especially that portion of the fiber that is stored in accordance with the Electronics Industry Association Spec. 568A. At the same time, the mounting should be capable of providing ready access to the stored fiber, and should be configured to provide ready and preferably visible connection thereto without the necessity of partially disassembling the mounting. In accordance with the principles of the invention, these criteria are met by the wall plate assembly 11 which comprises a flush mounted wall plate 14 having a lower portion 16 and an upper portion 17 which is pivotally mounted to lower portion 16 by means of a pivot pin 18. Lower portion 16 has a centrally located opening 19 into which a mounting screw (not shown) is inserted and which passes through a corresponding hole in the wall 12 and screws into a threaded mounting hole in outlet box 13. In this way, lower wall plate 16 is affixed to the wall 12 and the outlet box 13. In like manner, upper wall plate portion 17 has an upper mounting hole near the upper end thereof for receiving a mounting bolt (not shown) thereby securing upper portion 17 in place. As will be more apparent hereinafter, when the upper mounting bolt is removed, portion 17 of wall plate 14 can be swung forward and down, pivoting by means of pin 18, to provide access to the rear of upper portion 17.

Mounted to the rear of upper wall portion 17, in a manner that will be more clearly explained hereinafter, is a fiber storage spool 21 which comprises a cylindrical member 22 having a radius of curvature of its outer surface 23 of at least three-quarters of an inch (¾"), which is the minimum recommended radius for fiber curvature specified in the aforementioned Electronics Industry Association Spec. 568A. Thus, when the fiber to be stored is wound on spool 21, the minimum radius for the fiber is no less than three-quarters of an inch (¾"), and the fiber is firmly supported on the surface 23 of spool 21. Spool 21 has radially extending tabs 24 at the ends thereof and fiber locating fingers 26 for insuring that the fibers wound thereon to not slip off of the spool 21 or become entangled. Spool 21 and an integral mounting arm 25 are so dimensioned that when upper wall plate portion 17 is swung upward into its operative, vertical position, they enter outlet box 13 without any interference, and, when upper portion 17 is affixed in place, are substantially completely protected within box 13, behind wall 12.

Extending from the front face 27 of upper portion 17 is a protuberant member 28 having a front face 29 oriented at an angle to the plane of front face 27. As shown in FIG. 1, the front face 29 is at an acute angle to the front face 27 and hence, to the plane of the wall plate 14. Face 29 has first and second apertures 31, only one of which is clearly shown in FIG. 1, which are adapted to receive and hold first and second duplex couplers 32, as shown. As will be apparent hereinafter, openings or apertures 31 are so configured and dimensioned that, in place of one or more of the duplex couplers 32, the female portion of the modular telephone jack may be substituted.

Each duplex coupler 32 is adapted to receive two SC type connectors 33, only one of which is shown. It is to be understood that other types of couplers and connectors may be used, although the use of SC type connectors and couplers is preferred. Extending from the rear of the duplex coupler 32 are first and second SC connectors 34 and 36, with the fiber 37 from connector 34 extending over a fiber guide member 38, mounted on or integral with mounting arm 25, and the fiber 39 from 36 extending directly onto the surface 23 of storage spool 21. Such an arrangement minimizes any slack or unsupported lengths of the fibers 37 and 39, which keeping them separated, thereby avoiding tangling or interference with each other.

Face 29 also has a third aperture 41 into which is fitted the female portion 42 of a modular telephone jack, as shown, and a fourth aperture 43 for receiving the female portion 44. Face 29 also has a fifth aperture 46, as will be best seen in FIG. 2, for receiving a mounting lock (not shown), positioned on the distal end of arm 25 of the storage spool 21 for locking spool 21 in place at the rear of faceplate 14. It is to be understood that the apertures 31,31,41 and 43 may be configured in different ways to accommodate various types of connectors, however, the configurations shown in FIG. 1 are the preferred ones. All of the apertures, and the couplers mounted therein, are visible from the front of faceplate 14 when it is mounted in place, thereby materially facilitating the insertion and removal of the connectors from the front.

In order that the front of faceplate 14, when the plate is mounted in place and the several connectors are inserted in their respective couplers, be protected, a cover or hood member 47, having the configuration shown, is provided. Cover 47 has first and second inwardly extending mounting flanges 48 and 49 for slidably mounting cover 47 to the front 27 of faceplate 14. The upper portion 17 of faceplate 14 has track defining L-shaped brackets 51 and 52 and the lower portion has L-shaped brackets 53 and 54 which define the lower portion of the tracks for flanges 48 and 49. In use, the flanges 48 and 49 are inserted in their respective tracks and cover 47 is slid down along the tracks until the front face 27 and, more particularly, the connectors and couplers, are substantially completely covered. When access to the front or rear of wall plate 14 is desired, cover 47 can simply be slid up partially or completely to provide such access.

In all of the foregoing discussion, such terms as "up", "down", "above" and "below" as well as other terms of orientation are applicable to the faceplate orientation shown in FIG. 1. Obviously other faceplate orientations are possible, even to the extent of the faceplate 14 being mounted completely upside down, in which case the terms defining the orientation of the various parts would necessarily be different, but the positions of the several parts would remain the same relative to each other.

The flush mounted outlet assembly as shown and described in the foregoing is the subject of U.S. patent application Ser. No. 08/534,218 filed concurrently herewith on Sep. 26, 1995.

The following discussion is intended to present a more detailed description of the several components of the assembly of FIG. 1.

Hinged Faceplate

Figure 2:
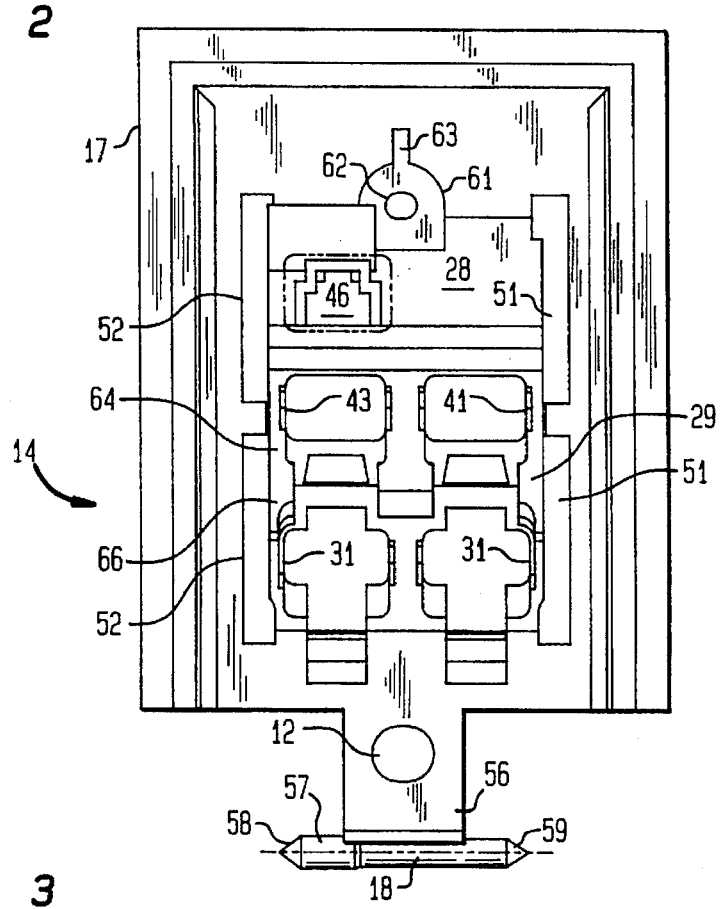
FIG. 2 is a front elevation view of the upper portion of the wall plate of the invention.
Figure 3:
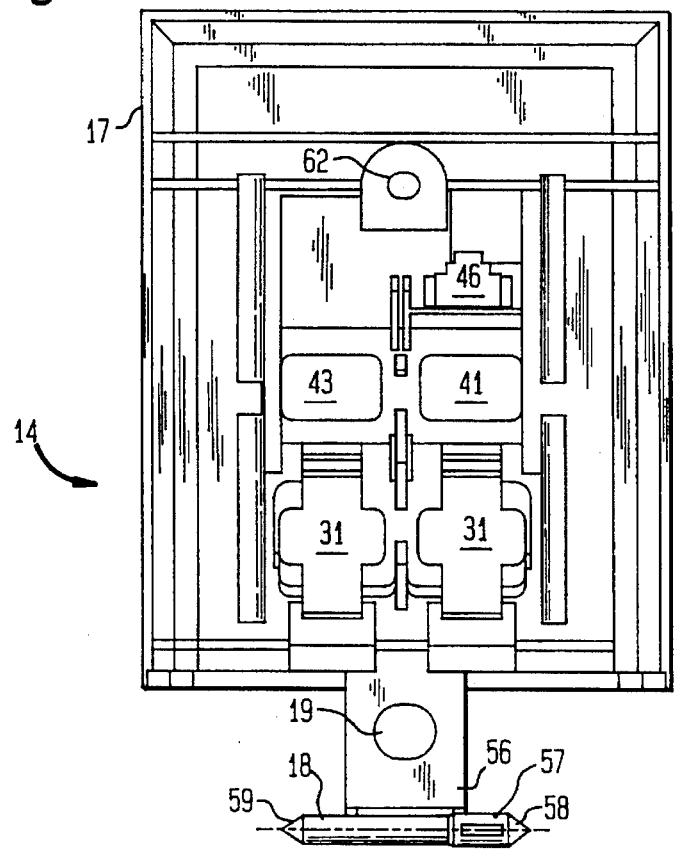
FIG. 3 is a rear elevation view of the upper portion of the wall plate of the invention.
Figure 4:
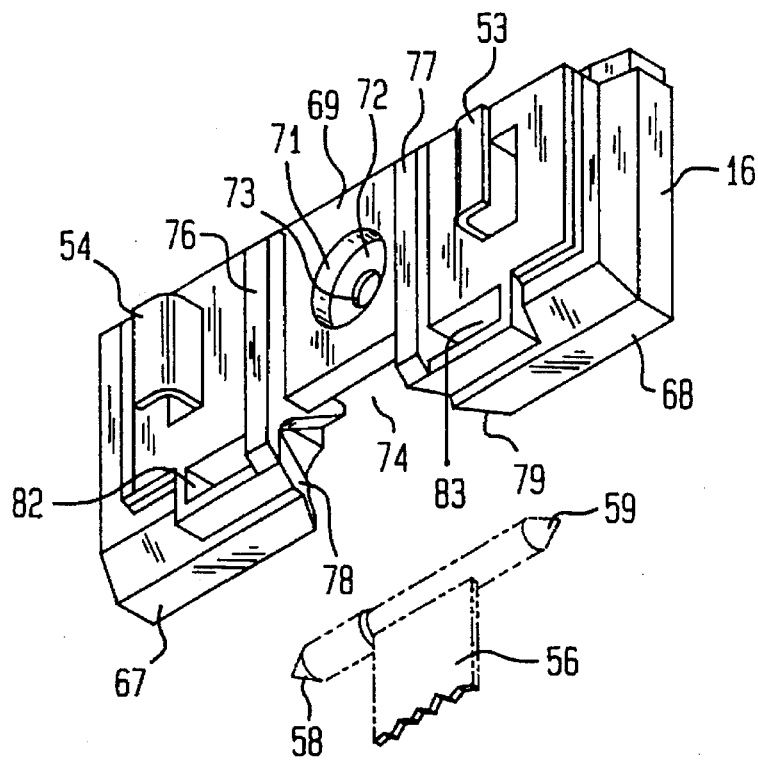
FIG. 4 is a perspective front view of the lower portion of the wall plate.
Figure 5:
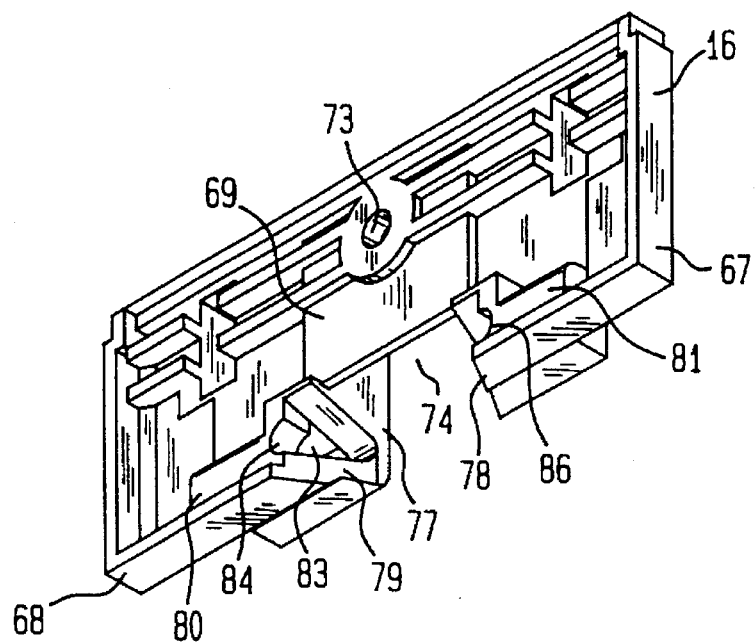
FIG. 5 is a perspective rear view of the lower portion of the wall plate.

In FIGS. 2 and 3 there are shown front and rear views, respectively, of the upper portion 17 of wall or faceplate 14, and in FIGS. 4 and 5, front and rear perspective views, respectively of the lower portion 16 of wall or faceplate 14.

Faceplate 14 is preferably made of a suitable plastic material such as, for example, a polycarbonate-ABS blend, which is both hard and durable, and which can readily be injection molded. The upper portion 17 of plate 14, as shown in FIGS. 2 and 3 comprises a substantially rectangular member having at the lower end thereof, a mounting tang 56 having, at the distal end thereof a pivot pin 18. As can be seen in the figures, one end of pin 18 has an enlarged portion 57 which is tapered to a point 58 and the other end of pin 18 also is tapered to a point 59. Tang 56 has aperture 19 therein through which a mounting screw passes. Extending substantially parallel to the sides of plate portion 17 are the L-shaped brackets 51,51 and 52,52, which, as pointed out hereinbefore, define tracks for the flanges 48 and 49 of hood 47 so that the hood 47 may be slid down over the front face 27 of portion 17 and, when in its "down" position, held in place. A mounting boss 61, having an aperture 62 therein, is located along the longitudinal center line of portion 17, with the center of aperture 62 being spaced from the center of aperture 19, a distance equal to the tapped mounting holes in the standard NEMA outlet box. Extending upward from box 61 is a stop lug 63 which, as will be more apparent hereinafter, functions as a stop for hood 47.

Protuberant member 28 has, in the front face 29 thereof, which is stepped, as best seen in FIG. 1, to produce an upper flat portion 64 and a lower flat portion 66, first and second apertures 31,31 in the lower portion 66, each of which is dimensional to receive a duplex coupler 32, as best seen in FIG. 1. The upper flat portion 64 has third and fourth aperture 41 and 43 for receiving the female member 42 and 44 of a pair of telephone jacks of standard configuration. The openings 31,31 are also dimensional to receive, where necessary, the female members of telephone jacks instead of the duplex couplers. Located above opening 43 is a fifth aperture 46 which has a configuration similar to the female opening in a telephone jack for receiving a mounting lock on the storage spool 21 to lock the spool 21 to the rear of faceplate 14, as will be explained more fully hereinafter.

Figure 7:
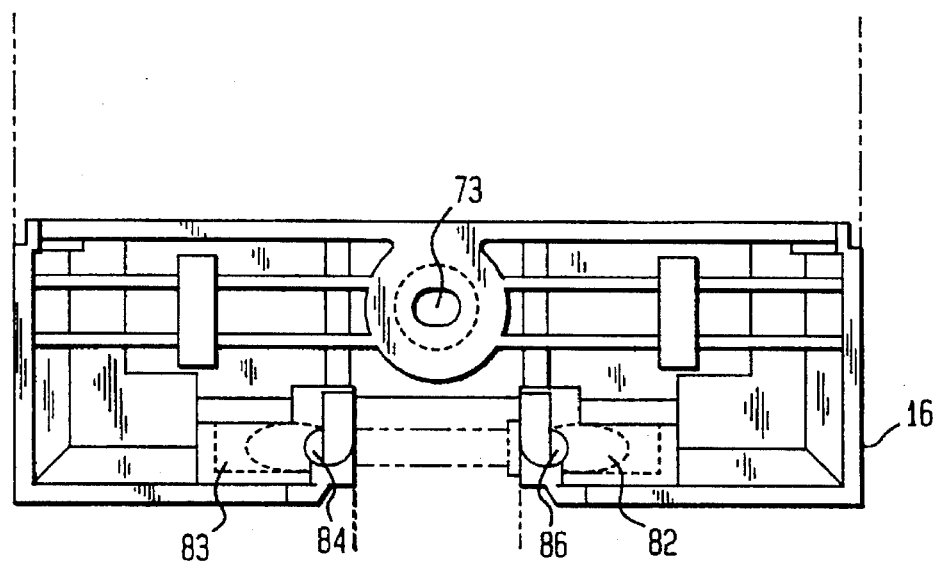
FIG. 7 is a rear elevation view of the lower portion of the wall plate.

In FIGS. 4, 5 and 7, the lower portion 16 of faceplate 14 is shown, to which, in use, the upper portion 17 is pivotally mounted. Portion 16 has first and second side sections 67 and 68 joined by a web member 69. Member 69 has a centrally located aperture 71 having an apertured floor portion 72 which has a smaller aperture 73. Aperture 73 is sufficiently large to allow passage of the shank of a mounting bolt, but not the head thereof. As a consequence, when member 16 is mounted in place and to outlet box 13, the head of the bolt bears against the floor 72 of aperture 71. As pointed out in connection with FIG. 1, member or portion 16 has L-shaped brackets 53 and 54, which, together with brackets 51 and 52 on member or portion 17, define the tracks for the flanges 48 and 49 of the hood 47.

Web 69, which is not as long as either side 67 or 68, forms therewith a centrally located opening 74 which is further defined by spaced ribs 76 and 77. The spacing of ribs 76 and 77 is slightly greater than the width of tang 56 so that, when the faceplate is fully assembled as seen in FIG. 1, tang 56 is restrained from lateral movement by the ribs. The ribs define the narrowest portion of opening 75, which has angled side members 78 and 79 extending from the front of the back of member 16 or, as viewed in FIG. 4, from top to bottom. On the sides of opening 75 are pin receiving slots 82 and 83, the inner ends of which have the ribs 76 and 77 respectively, extending across the top, as seen in FIGS. 4 and 5. The bottom walls 80 and 81 of slots 82 and 83 are radiused at 84 and 86 as shown, and the undersides of ribs 76 and 77 are sloped and radiused as best seen in FIG. 5.

Figure 6:
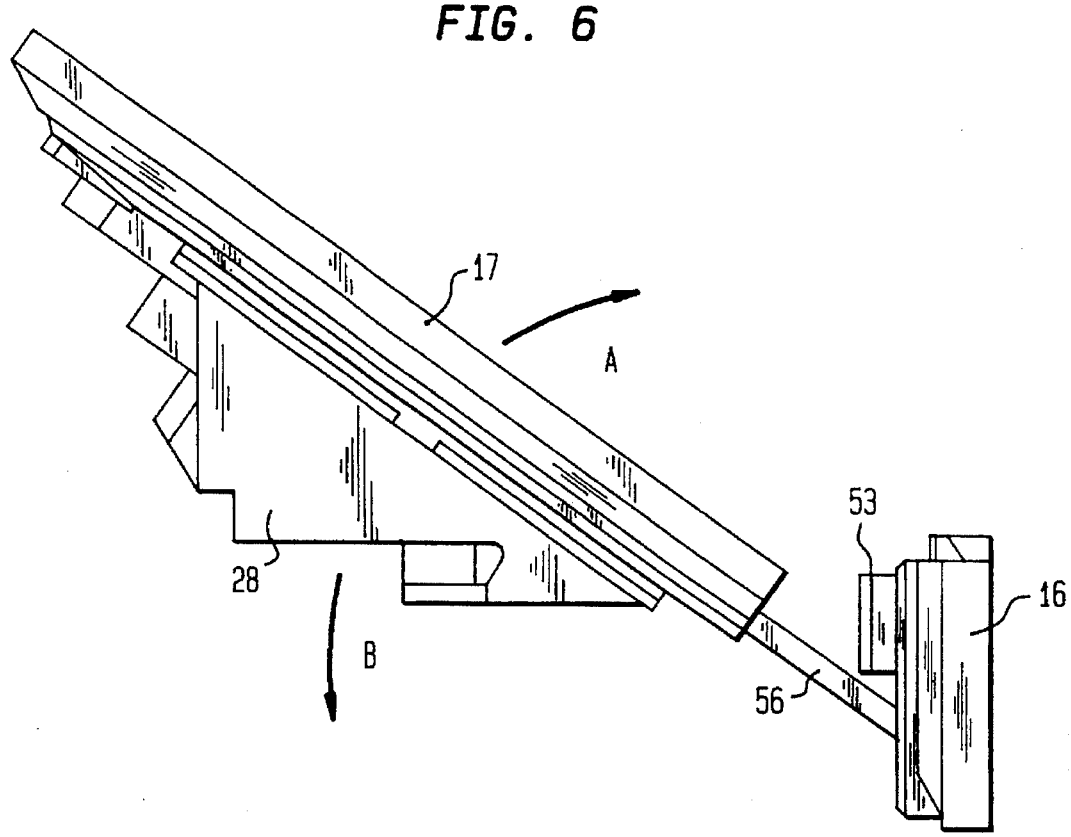
FIG. 6 is a side elevation view of the upper and lower portions of the wall plate as pivotally joined together with the upper portion being partially swung forward.

In order to attach member 17 to member 16, member 17 is swung down below members 16 to an orientation shown in dashed lines in FIG. 7 where the angle of orientation relative to member 16 is preferably greater than 180°, and by dashed lines in FIG. 4. Because of the sloping surfaces 78 and 79, tang 56 can be moved laterally inasmuch as it is at the widest portion of the opening 74. Thus, tang 56 can be shined to the left, as viewed in FIG. 4 until the tip 59 of pin 18 dears the radiused portion 84 and the small end of pin 18 enters slot 83, passing under rib 77. Tang 56 is then shifted to the right as viewed in FIG. 4 until tip 58 of pin 18 clears the radius 86 at which time tang 56 is moved toward its center position, thereby inserting the large end of pin 18 into slot 82, passing under rib 76. Upper portion or member 17 is then rotated about the axis of pin 18 in the direction of the arrow A. As member 17 is rotated, the width of opening 74 becomes increasingly smaller for tang 56, and it is cammed by the sloping portions 78 and 79 toward its central position. Thus, lateral movement of tang 56 is increasingly restricted, and the ends 58 and 59 of the pin 18 cannot slip out of the respective slots 82 and 83. During the initial introduction of pin 18 into opening 74 the sloping portions of the undersides of ribs 76 and 77 function as guides to assist in centering the pin axis along the centerline or axis of the slots 82 and 83. Continued rotation of member 17 in the direction of arrow A, as shown in FIG. 6, brings it into vertical alignment with lower member 16, as best seen in FIG. 1, at which time it and member 16 can be affixed to the outlet box 13. When hood 47 is slid into place with the L-shaped brackets 51, 52, 53 and 54 holding flanges 48 and 49 in place, lower and upper portions 16 and 17 are locked in place, hence, even if the bolt for fastening the upper portion 17 to the box 13 should work loose or were missing, the plate 14 would still be flat against the wall. When access to the rear of upper portion of member 17 is desired, hood 47 is removed and pivoted in the direction of arrow B, as discussed hereinbefore. Because of the construction of member 16, mainly opening 74, slots 82 and 83, ribs 76 and 77, sloped surfaces 78 and 79, and pin 18, upper portion 17 would have to be pivoted down past the vertical to at least the position shown by the dashed lines before there would be any possibility of the pivot pin 18 slipping out of its slots 82 and 83. Inasmuch as the assembled wall plate 14 is flat against the wall, it would be impossible for it to be swung past the vertical, hence there is no danger of an accidental detachment of upper portion 17 from lower portion 16.

Storage Spool

Figure 8:
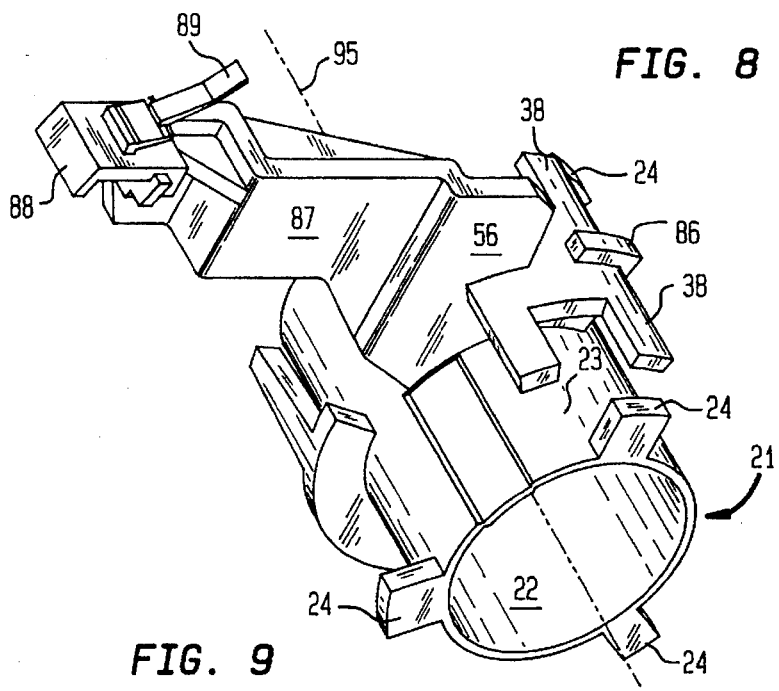
FIG. 8 is a top perspective view of the storage spool for use with the wall plate of FIGS. 1, 2 and 3, including its mounting means.
Figure 9:
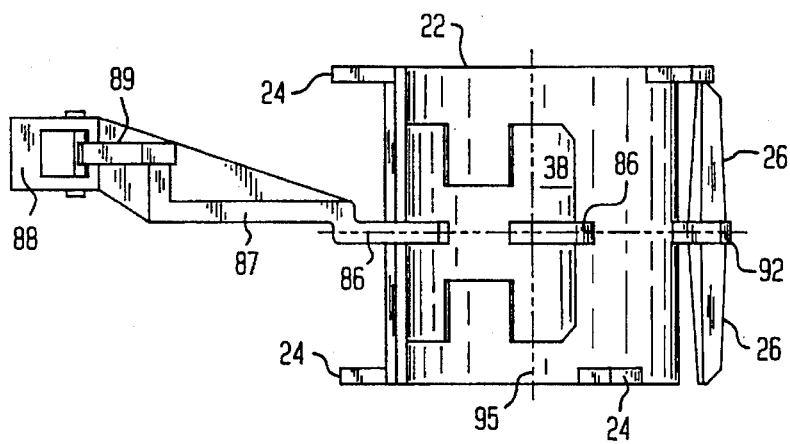
FIG. 9 is a plan view of the top of the storage spool of FIG. 8.
Figure 10:
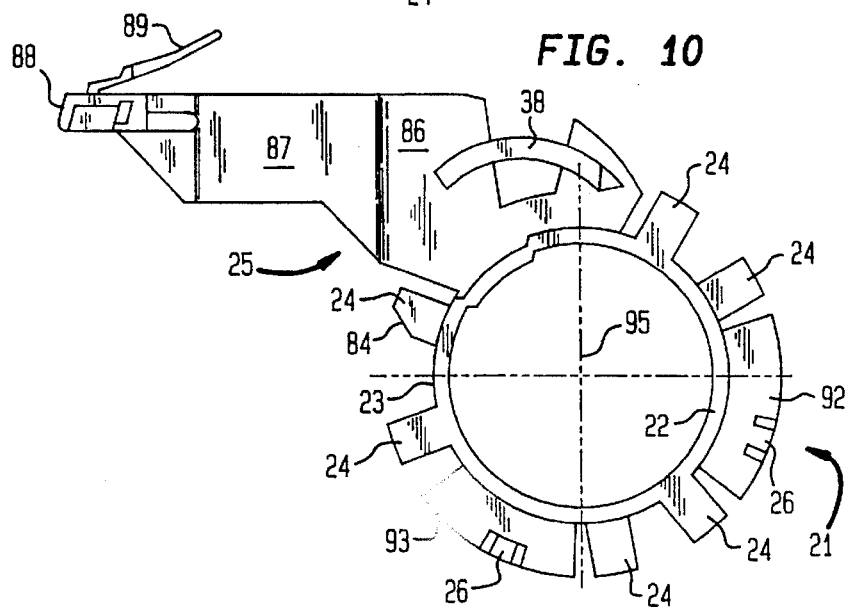
FIG. 10 is a side elevation view of the storage spool of FIG. 8.

Storage spool or drum 21 is shown in perspective in FIG. 8 and in plan and elevation views in FIGS. 9 and 10, respectively. Spool 21, which is made of suitable material such as, for example, a polycarbonate-ABS blend, comprises a cylindrical member 22 having a longitudinal axis, an outer surface 23 which has a radius of curvature of three-quarters of an inch (¾") or more, thus insuring that optical fibers, preferably buffered, wrapped and stored thereon will have a minimum bend radius of three-quarters of an inch (¾") which, as pointed out hereinbefore, is the minimum recommended radius for fiber curvature specified in Electronics Industry Association Spec. 568A. On each end of the cylinder 22 are angularly spaced radially projecting retaining tabs 24, with the tabs on end being angularly offset from the tabs on the other end, as best seen in FIG. 10. Also, as can be seen in FIG. 10, one of the tabs 24 closest to the wall plate when the spool is mounted thereon, has an angled or beveled portion 84 which facilitates winding optical fibers onto the spool. The tabs 24 perform the primary function of preventing fibers wound on the spool from slipping off at the ends thereof. Centrally located between the ends of the cylinder is a mounting arm 25 integral with cylinder 22. Arm 25 has a first divider septum or wall 86 at its proximal end which, in effect, divides cylinder 22 into two storage areas. Extending from wall 86 is an elongated arm 87 which has at the distal end thereof a spring latch mounting and locking member 88 which is adapted to fit within the aperture 46 and locked therein by means of cantilever spring 89 in the same manner that the male member of telephone jack locks into the female member. As can best be seen in FIG. 9, arm 87 is offset from wall 86 in order that member 88 is aligned with the opening 46 in plate 17 while maintaining the spool in a central position.

Mounted on or integral with the dividing wall member 86, and extending outward therefrom on either side is an arcuate fiber guide member 38. As can be seen in FIG. 1, guide member 38 is used to maintain separation between the fiber from connector 34 and the fiber from connector 36 while providing support from the fibers, thereby minimizing slack fiber. In practice, the fiber from connector 34 is passed over guide member 38 and supported thereby, and the fiber from connector 36, the end of which is close to surface 23, is passed under guide 38, and the fibers are then wound on spool 22 for storage and to provide the required maximum of one meter of excess fiber, as discussed hereinbefore. Centrally located on spool 22 and extending radially therefrom are first and second separating walls 92 and 93 from which extend fiber locating and retaining fingers 26,26 which are substantially parallel to the axis of cylinder 22 and spaced from surface 23. When the fibers are wound onto cylinder 22, the walls 92 and 93 assist in maintaining separation of the fibers and the fingers 26 function to hold the fibers on or close to surface 23, thereby minimizing or preventing any loops of slack fiber.

The dimensions of the spool 21 and its mounting arm 25 are such that, when the spool is mounted to the rear of upper portion 17 of hinged faceplate 14, there is no interference between spool 21 and the walls of the outlet box 13, either when the spool is enclosed therein or when faceplate portions 17 is pivoted outwardly. The enclosing of the spool with the fibers wound thereon adds another order of protection for the fibers. Not only are the fibers protected by being behind the wall and hence isolated from high traffic on the room side of the wall, but the fibers are also protected by the standard outlet box 13. Substantially optimum dimensions for the spool assembly are a radius of curvature of surface 23 of no less than three-quarters of an inch (0.75"), the length of cylinder 22 is approximately one and six-tenths inches (1.6"), walls 92 and 93 are approximately one-quarter of an inch (0.25") high and twelve one-hundredths of an inch (0.12") thick, and the distal end of arm 25 is approximately two and fifty-nine one-hundredths inches (2.59") from the central axis of cylinder 22. These dimensions are given here for illustrative purposes only and, although they have been found to be, in practice, preferred, it is to be understood that changes to one or more of these dimensions may be made so long as the spool assembly still functions in the manner intended, as set forth in the foregoing. Also, it is to be understood that while the mounting jack arrangement 88 and 89 has been found to function well and is to be preferred, other types of mounting arrangements, including permanent mounting, might be used provided the spool assembly retains the functional advantages set forth hereinbefore.

The spool assembly as set forth in the foregoing is the subject matter of U.S. patent application Ser. No. 08/533, 156 filed concurrently herewith.

Protective Hood

The protective hood 47 of FIG. 1 is shown in detail in FIGS. 11 through 14. As discussed in the foregoing, hood 47 is removably mounted on the front wall plate 14 when the plate is in its assembled and mounted condition, and can either be partially slid up to provide an open position for access to the various couplers 32, 32, 42 and 44 or can be completely removed when it is desired to pivot upper portion 17 of the wall plate 14 relative to lower portion 16.

In the following discussion, such terms as "lower" and "upper" refer to the hood relative to the face or wall plate 14 being mounted in an upright vertical position. Obviously there can be other orientations of the face or wall plate 14, whereby the terms "lower" and "upper" should be read as defining the orientation of the hood relative to the face or wall plate 14 in whatever orientation it may have.

Figure 11:
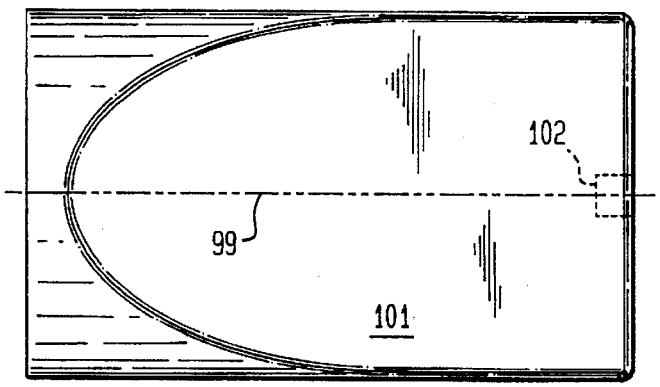
FIG. 11 is a top plan view of the hood or cover for use with the wall plate of FIGS. 1 through 5.
Figure 13:
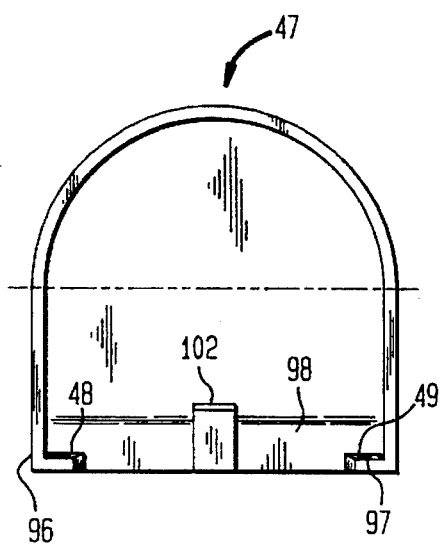
FIG. 13 is an end elevation view of the hood of FIG. 11.
Figure 12:
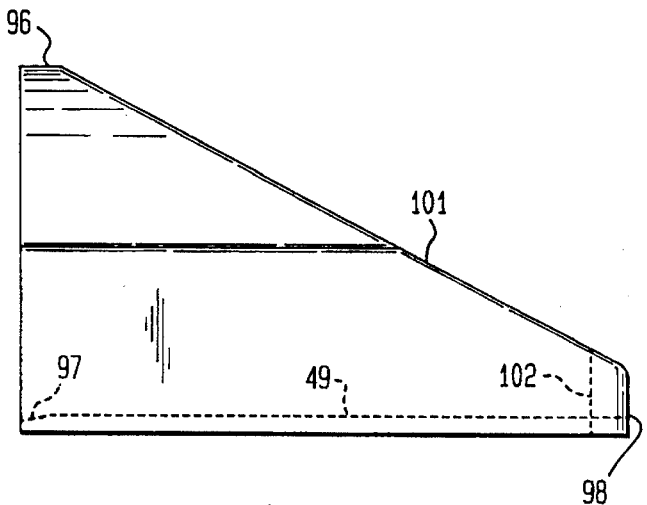
FIG. 12 is a side elevation view of the hood of FIG. 11.
Figure 14:
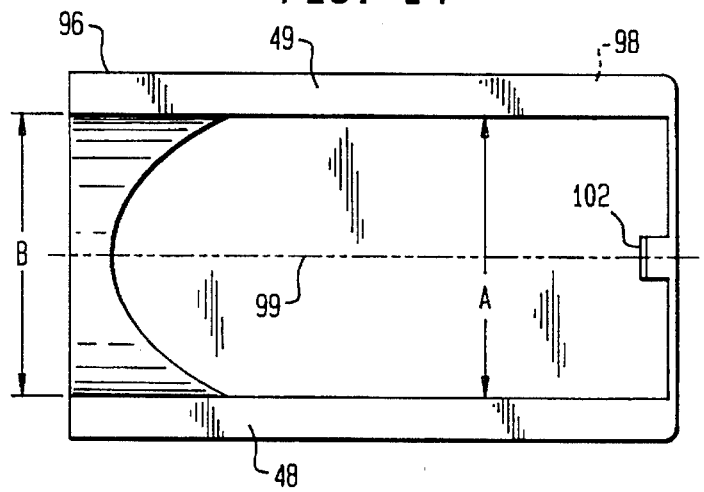
FIG. 14 is a bottom plan view of the hood of FIG. 11.

Hood 47, which is an elongated substantially hollow member, and which may be made of any suitable light weight semi-rigid material, such as, for example, a polycarbonate-ABS blend, has a U-shaped open lower end 96, as best seen in FIG. 13. The ends of the U-shape terminate in inwardly extending flanges 48 and 49 each of which has a slight taper 97 at the open end, as best seen in FIG. 12, for ease of insertion of the flanges 48 and 49 under the lips of the L-shaped track forming brackets 51, 52, 53 and 54 as seen in FIG. 1. Hood 47 has an upper end 98 (right hand end as shown in FIGS. 11, 12, and 14), which is flat and oriented normal to the centerline 99 of hood 47, as best seen in FIG. 14. End 98 is joined to the front end or lower portion 96 of hood 47 by a sloped planar surface 101 which extends, as shown, from a point above lower end 96 to the end 98. A stop member 102 is currently located, preferably centrally, on the interior side of flat end 98, and, in use, functions to limit the downward movement of hood 47 over face or wall plate 14 by butting against stop member 63 which is best seen in FIG. 2, thereby establishing the closed position of the hood.

In order that hood 47 may be easily moved in the tracks formed by the brackets 51, 52, 53 and 54, the facing tips of the flanges 48 and 49 at the open end 96 are spaced apart a distance B which is slightly greater than the distance A between the tips of the flanges at the closed end 98. This differential spacing, plus the tapers 97,97 on the lower ends of the flanges, make insertion of hood 47 onto the tracks and movement therealong relatively easy so that any one desiring to remove or install the hood can do so with a minimum of effort.

Protective hood 47 may be made opaque, transparent, or translucent, and may be, if desired, colored to match a room decor for example, as may face or wall plate 14.

The protective hood 47 is the subject of U.S. patent application Ser. No. 08/533,156 filed concurrently herewith.

The flush mounted universal outlet assembly of the invention and the several components thereof provide a large measure of protection of the various connectors and associated wires or fibers, both by means of the protective hood and the unique configuration which places the stored portions of the optical fibers behind the room wall and within the outlet box. The assembly provides ready, visible access to all connectors on both the front and the rear of the wall plate, and is designed to mount to a standard outlet box. No special tools are required for assembling the several parts, all of which are readily separable from each other and yet which form a unitary whole.

In concluding the detailed description it should be noted that it will be obvious to those skilled in the art that many variations and modifications might be made to the preferred embodiment without substantial departure from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions in combination with other elements as specifically claimed.

I claim:

1. A faceplate for mounting to an independent outlet box, said faceplate comprising:

a substantially planar body having first and second portions and front and rear faces;

said body having at least one aperture for mounting a coupler therein which extends through said body for receiving a cable connector;

first means for mounting and affixing said first portion to the outlet box;

pivot means for detachably and pivotally mounting said second portion to said first portion to permit said second portion to be pivoted outward from the plane of said faceplate; and second means for mounting said second portion to the outlet box.

2. A faceplate as claimed in claim 1 wherein said pivot means for detachably and pivotally mounting said second portion to said first portion comprise a pivot pin on one of said portions and a pivot pin receptacle on the other of said portions.

3. A faceplate as claimed in claim 2 wherein said pivot pin receptacle has means for receiving said pivot pin when said second portion is at an angle of orientation relative to the plane of said first portion.

4. A faceplate as claimed in claim 3 wherein the angle of orientation of said second portion is greater than 180° relative to the plane of said first portion.

5. A faceplate as claimed in claim 3 wherein said means for receiving said pivot pin includes means for preventing said pivot pin from being removed when said second portion lies within the plane of the faceplate.

6. A faceplate as claimed in claim 1 and further comprising means in said rear face for receiving and mounting a cable storage member to said rear face.

7. A faceplate for mounting to an outlet box, said faceplate comprising:

a substantially planar body having first and second portions and from and rear faces;

said body having at least one aperture for mounting a coupler therein which extends through said body for receiving one or more cable connectors;

means for individually mounting said first and second portions to the outlet box;

said second portion having a lower end having a tang member with a width less than that of said second portion depending therefrom and having a distal end;

a pivot pin transversely mounted on said distal end of said tang member and extending past the edges thereof;

said first portion having first and second spaced side members connected by a flat web member, said web member having thereon rib means defining a tang receiving space for restricting lateral movement of said tang;

said first and second sides and said web member defining an opening having sides which taper from the width of the tang receiving space to a greater width at the rear face of said first portion;

pin receiving laterally extending slots adjacent the opening on each side thereof, and said rib means extending over the ends of said slots adjacent to hold said pivot pin within said slots.

8. A faceplate as claimed in claim 7 wherein said front face of said second portion has a protuberant member extending therefrom, said protuberant member having a first face oriented at an angle to the plane of said faceplate, said first face being apertured to receive at least one coupler member therein.

9. A faceplate as claimed in claim 8 wherein said first face has two apertures therein for receiving duplex type optical fiber type couplers.

10. A faceplate as claimed in claim 8 wherein said protuberant member has a second face oriented at an angle to the plane of said faceplate having at least one aperture therein for receiving an electrical type coupler.

11. A faceplate as claimed in claim 10 wherein said second face has two apertures therein for receiving electrical type couplers.

12. A faceplate as claimed in claim 10 wherein said second face is parallel to said first face.

13. A faceplate as claimed in claim 8 wherein said first face of said protuberant member is at an acute angle to the plane of said faceplate.

14. A faceplate as claimed in claim 7 and further including mounting means on said rear face thereof for mounting a storage member thereto.

15. A faceplate as claimed in claim 14 wherein said mounting means comprises an aperture in said rear face.

16. A faceplate as claimed in claim 7 wherein said front face of said faceplate has means thereon for mounting a protective hood over said front face.

17. A faceplate as claimed in claim 16 wherein said means for mounting a hood comprises means forming, locating, and hood holding tracks thereon extending along the front face of said faceplate.

* * * * *